March 17, 1936. J. W. MYERS ET AL Re. 19,894

BUFFING WHEEL

Original Filed Feb. 21, 1930

INVENTORS
JOSEPH W. MYERS
ERNEST E. MURRAY

BY Elliott J. Stockbridge

ATTORNEY.

Reissued Mar. 17, 1936 Re. 19,894

UNITED STATES PATENT OFFICE 19,894

BUFFING WHEEL

Joseph W. Myers, Philadelphia, Pa., and Ernest E. Murray, Jackson, Mich., assignors, by mesne assignments, of one-half to L. W. MacFarland, Long Island City, N. Y.

Original No. 1,922,108, dated August 15, 1933, Serial No. 430,416, February 21, 1930. Application for reissue August 14, 1935, Serial No. 36,234

22 Claims. (Cl. 51—193)

Our invention relates to buffing wheels and an object of our improvements is to provide an improved buffing wheel, which is cheap to make and durable in use. We secure this object in the device illustrated in the accompanying drawing, in which.

2 is a spindle. 3, 3 are the securing discs. 32 is a nut engaging one of the discs 3 upon the spindle 2. 4 is a bolt of which there are a number distributed around the peripheries of the discs, 3, 3 and extending between said discs.

Figure 2:
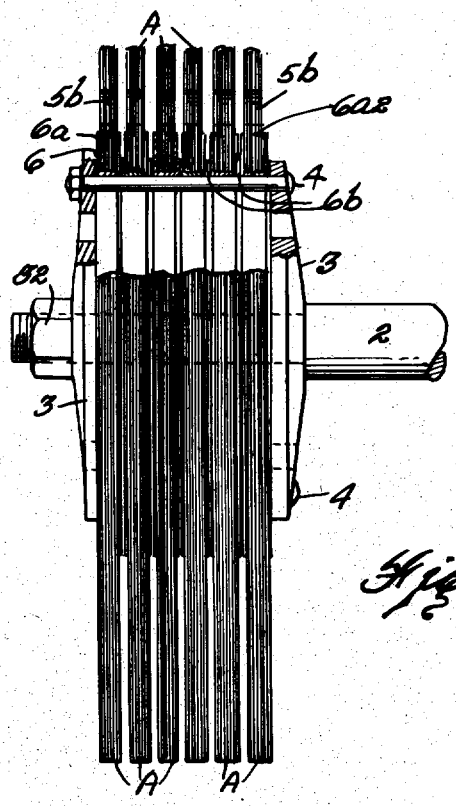
Fig. 2 is an edge elevation of a buffing wheel upon its spindle, the sections being broken away and sectioned, as indicated by the line II, II, II, II, Fig. 1.
Figure 5:
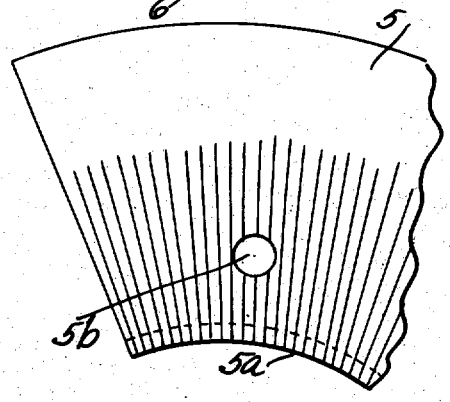
Fig. 5 is a face view showing a part of the textile strip of which the sections are made.

A indicates the sections, of which there are six shown in Fig. 2 laying side by side threaded upon the bolts 4 and constituting the buffing wheel. To make a section A, a strip of cloth of sufficient width is taken and one edge is gathered in ridges 5a (Fig. 5). The strip is formed into a spiral by the gathering of its edge and the different spires are laid together to constitute the section A. This gives a ring construction with a circular periphery and the inner edge and the ridges formed by the gathers space the different spires, or layers, apart from each other, so as to permit the passage of air for cooling the material. Each of the sections A has an aperture 5b for the entrance of air formed transversely through it towards its inner edge and the sections may be arranged so that these apertures may be in line, as shown at the top of Fig. 2.

To bind the various layers, or spires, of a section firmly together we provide a strip of sheet metal 6, which consists preferably of an integral central portion with sharpened projections 6a extending from its sides. The projections 6a upon one side are staggered with reference to those upon the other side.

Figure 1:
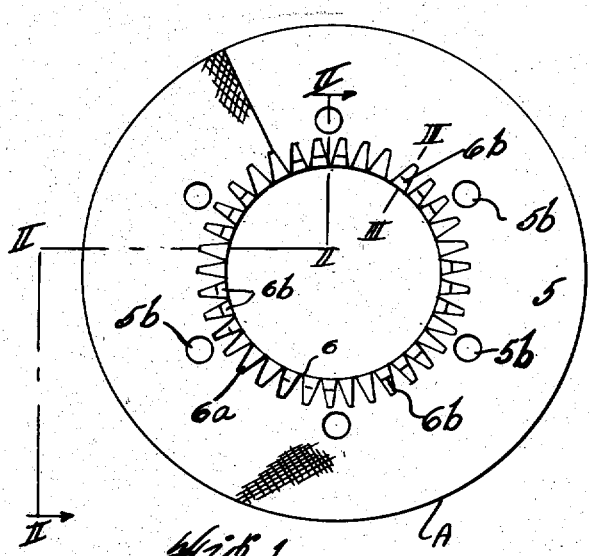
Fig. 1 is a face view of a buffing wheel section.
Figure 4:
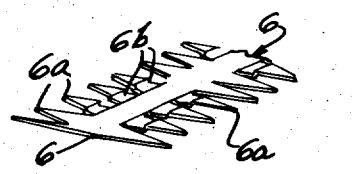
Fig. 4 is a perspective view of a portion of the securing band.
Figure 3:
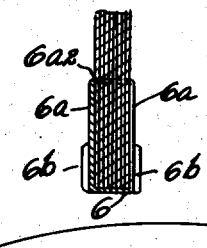
Fig. 3 is a detail section on the line III, III, Fig. 1.

The strip 6 is placed around the inner edge of the spires, or layers, of a section and its edges, or projections 6a, are bent upward and clamped by dies against the layers, or spires, so as to bind the inner edges of the same firmly together, as shown most distinctly in Fig. 3.

When a construction employing the sharp projections 6a, shown in the drawing, is used the outer ends of the projections are bent inward so that when the strip is clamped against the layers of the section, as above described, this sharp bent-in portion of the projection 6a will be pressed by the die into the textile material of the strip, as shown at 6a2. The projection 6a upon opposite sides being staggered, their sharp ends may extend past each other when pressed into the material of the section. The strip 6 is bent outward in one side of the central portion to form spacing lugs, or bulges 6b, which act to space the sections upon the spindle, as shown in Fig. 2.

The sections may be quickly and cheaply made, as above described, and the assembled structure provides for the circulation of air between the sections and also through the apertures 5b between the layers and in conduits formed by the ridges, or gathers, 5a. It is found that with this construction the material will last nearly twice as long as by the construction now in use.

The sections A are securely clamped between the discs 3, 3, which are provided with apertures, as shown, to permit of the ingress of air for cooling.

What we claim is:

1. An annular buffing wheel consisting of a plurality of rings of cloth and a ring-shaped metal binding ring passing around the inner edges of said cloth rings and having its edges bent outward and towards each other so as to clinch the inner edges of said rings of cloth together firmly and permanently by the resilience of the material of said binding ring.

2. An annular buffing wheel section consisting of a plurality of layers of cloth and a sheet metal strip extending around the inner edges of said layers and having its edges bent outward and toward each other so as to clamp said layers together firmly and permanently by the resilience of the material of said strip.

3. An annular buffing wheel section consisting of a plurality of layers of cloth and a sheet metal strip extending around the inner edge of said layers and having its edges bent outward and toward each other so as to clamp said layers together firmly and permanently by the resilience of the material of said strip, said metal strip being provided with in-bent portions at its edges adapted to penetrate the material of said layers said portions extending into said layers.

4. A buffing wheel consisting of a plurality of annular sections placed side by side each section consisting of a plurality of layers of cloth and a sheet metal strip extending around the inner edges of said layers and bent over upon and clamping said layers together, said metal strip being provided with a spacing lug at its side whereby an air passage is left between adjacent strips, as and for the purpose described.

5. A buffing wheel section consisting of a plurality of strips of textile material gathered at their inner edges so as to produce angularly spaced radially extending folds or ridges laid flat against each other and means for securing said strips in their relative positions, said section being provided with a transverse opening through their gathered portions for the purpose described.

6. An annular buffing wheel section consisting of a plurality of strips of textile material gathered at their inner edges so as to produce angularly spaced radially extending folds or ridges and laid flat against each other and means for securing said strips in their relative positions, conduits thus formed between the layers being open to the atmosphere at both ends.

7. A buffing wheel consisting of ring shaped multiple layer unitary sections, each section being formed with a permanently affixed metal ring-shaped binding strip around its inside edge, said ring-shaped sections being side by side over a centering hub contacting with the metal bound inside edge of the individual sections, said centering hub having a diameter greater than the spindle diameter of the buffing lathe and said sections being clamped together and to said spindle by flanges gripping the end sections at the metal binding strip and the rotating spindle near their centers.

8. A buffing wheel section consisting of a plurality of strips of textile material gathered at their inner edges and laid flat one upon the other, said section being provided with a transverse opening through its gathered portion toward its inner edge and securing discs having air passages therethrough communicating with the inner ends of the passages formed by the gathering of the materials, for the purpose described.

9. A buffing wheel having radial passages therein open at both ends and discs for securing said wheel upon its spindle, said discs having air passages therethrough communicating with the inner ends of said passages, as and for the purpose described.

10. A buffing wheel consisting of ring-shaped multiple layer unitary sections, each section being formed with a permanently affixed metal ring-shaped binding strip around its inner edge having a spacing lug at its side whereby an air passage is formed between adjacent binding strips around its inside edge, said ring-shaped sections being side by side over a centering hub contacting with the metal bound inside edge of the individual sections, said centering hub having a diameter greater than the spindle diameter of the buffing lathe, its interior communicating with the outside air and with the inner end of said air passage and said sections being clamped together and to said spindle by flanges gripping the end sections at the metal binding strip and the rotating spindle near their centers.

11. A buffing wheel consisting of ring-shaped multiple layer unitary sections, each section being formed with a permanently affixed metal ring-shaped binding strip around its inner edge having a spacing lug at its side whereby an air passage is formed between adjacent binding strips around its inside edge, said ring-shaped sections being side by side over a centering hub contacting with the metal bound inside edge of the individual sections, said centering hub having a diameter greater than the spindle diameter of the lathe, its interior communicating with the inner end of said passage and said sections being clamped together and to said spindle by flanges gripping the end sections at the metal binding strips and the rotating spindle near their centers, said flanges having apertures therethrough communicating with the outer air and the interior of said hub.

12. A buffing wheel consisting of a plurality of annular sections placed side by side, each section consisting of a plurality of layers of cloth and a sheet metal strip extending around the inner edges of said layers and bent over upon and clamping said layers together, said metal strip being provided with a spacing lug at its side struck up from the material of said strip, whereby an air passage is left between adjacent strips as and for the purpose described.

13. In a sectional ventilated buffing wheel, a plurality of buffing sections, means for assembling said sections for rotation as a unit, transverse air passages defined in said sections and spaced radially and outwardly from said means, and means spacing said sections to provide radial air passages communicating with said first air passages.

14. In a ventilated buffing wheel, a plurality of buffing sections, means for supporting said sections for rotation as a unit about an axis, transverse air passages defined in said means at points spaced radially outward from said axis of rotation, and means defining radial air passages between said sections communicating with said first air passages.

15. In a ventilated buffing wheel, a plurality of buffing sections, means for assembling said sections for rotation as a unit, transverse air passages defined through the body of said sections, and means providing radial air passages communicating with said first air passages.

16. In a ventilated buffing wheel having a spindle, a plurality of buffing sections having axially aligned central openings to receive said spindle, axially extending air passages through the body of said sections located outwardly from said central openings, and means providing radially extending air passages in said wheel communicating with said first air passages.

17. In a ventilated buffing wheel, a plurality of separable buffing sections, fabric structure constituting the body of said sections, means spacing the fabric structure of said sections to provide radially extending air passages, and axially extending air passages communicating with said first air passages and defined in the body of said sections, said axially extending air passages being entirely disposed radially of the axis of rotation of said wheel.

18. A buffing wheel having a radial air passage passing through the substance thereof, a central spindle upon which the wheel is rotated thereon as a unit, an axially extending air passage defined in said substance and disposed radially outward from said spindle communicating with said first air passage.

19. A buffing wheel comprising a plurality of buffing sections having body structures of fabric, means disposed between adjacent sections for spacing said body structures and defining radial air passages, and axially extending air passages defined in said body structure and spaced radially with reference to said means, said last air passages communicating with said first air passages.

20. A buffing wheel comprising a plurality of buffing sections, a spindle upon which said sections are supported for rotation therewith as a unit, means defining radial air passages between adjacent buffing sections, axially extending air passages defined in said sections communicating with said first air passages, said first and second air passages being entirely defined by structure disposed radially outward with reference to said spindle.

21. In a ventilated buffing wheel, a plurality of separable buffing sections, means located at opposed sides of said wheel for clamping said sections together, a spindle upon which said sections are rotated as a unit, means defining communicating air passages disposed radially and axially through said wheel, said last means being constituted entirely independent of said spindle.

22. In combination, a sectional ventilated buffing wheel, a centrally located spindle therefor, an air passage defined in said wheel disposed radially of said spindle and through which air is drawn into the body of said wheel, and a second air passage defined in said wheel communicating with said first passage and through which air is expelled.

JOSEPH W. MYERS.
ERNEST E. MURRAY.